July 7, 1953 H. J. KRUSE ET AL 2,644,828
CRYSTALLINE FERRIC AMMONIUM CITRATE COMPOUNDS
Filed June 10, 1949

Harry J. Kruse
Henry C. Mounce
Inventors
Haynes and Koenig
Attorneys

Patented July 7, 1953

2,644,828

UNITED STATES PATENT OFFICE 2,644,828

CRYSTALLINE FERRIC AMMONIUM CITRATE COMPOUNDS

Harry J. Kruse, St. Louis, and Henry C. Mounce, Ferguson, Mo., assignors to Mallinckrodt Chemical Works, St. Louis, Mo., a corporation of Missouri Application June 10, 1949, Serial No. 98,204

14 Claims. (Cl. 260—439)

This invention relates to crystalline compounds and more particularly to new crystalline compounds containing iron.

This invention, in brief, is directed to novel and comparatively non-hygroscopic crystalline ferric ammonium citrates and to methods of making them comprising dissolving ferric hydroxide in a solution of ammonium citrate in a ratio of approximately 1 mole of ferric hydroxide to 0.65 mole of citric acid, adding the balance of the citric acid, and thereafter crystallizing from the solution crystalline green ferric ammonium citrate. The present invention also includes the above method with the additional step of saturating the citric acid solution with gaseous ammonia whereby brown ferric ammonium citrate crystals are formed.

Among the several objects of the present invention are the provision of new compounds of citric acid with iron and ammonia; the provision of compounds of the type described which are crystalline and which are substantially less hygroscopic than related compositions known heretofore; the provision of compounds of the type described which are handled more easily and which are more stable when stored than related compositions known heretofore; and the provision of a simple and convenient process for making same. Other features will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

Figure 2:
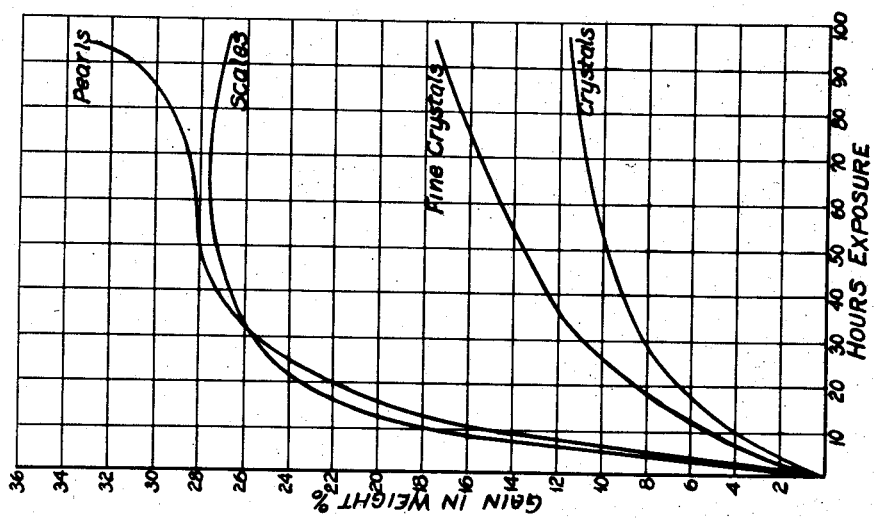
Figure 1:
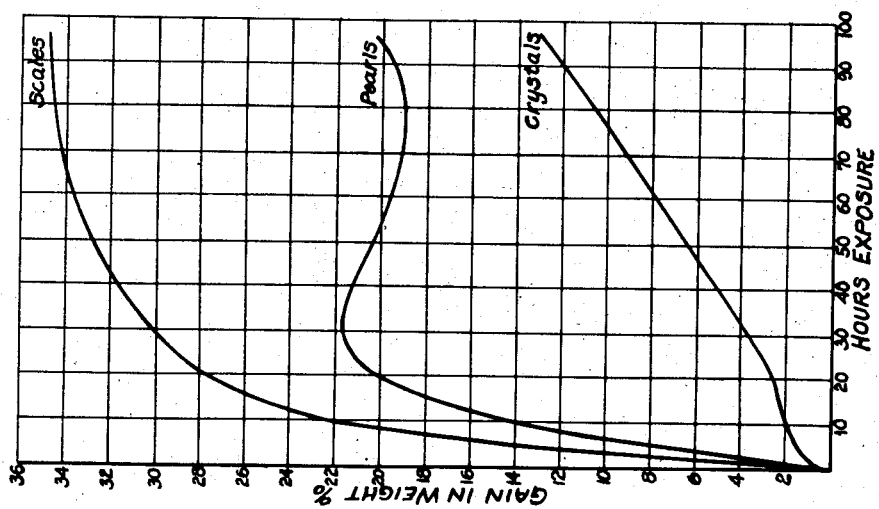

In the accompanying drawing,

Fig. 1 illustrates hygroscopicities of the prior art amorphous green iron and ammonium citrates as compared to that of the green crystalline iron ammonium citrate of the present invention; and, Fig. 2 illustrates hygroscopicities of the prior art amorphous brown iron and ammonium citrates as compared to that of the brown iron ammonium citrate of the present invention.

Chemically indefinite mixtures of citric acid, iron and ammonia have been recognized for many years in the U. S. Pharmacopoeia and National Formulary. Because of their much greater solubility, they have been used in preference to ferric citrate for the treatment of anemia and in the preparation of tonics. Industrially they have also been used in the manufacture of blue-print papers.

These iron and ammonium citrates are available in two chemically different forms. Green iron and ammonium citrate usually contains 14.5–16% of Fe, about 1½ moles of citric acid for each mole of iron and sufficient ammonia to make the composition neutral or only slightly acid to litmus. Brown iron and ammonium citrate contains 16.5–18.5% Fe, about 1 mole of citric acid for each mole of iron, and sufficient ammonia to make the composition slightly alkaline to litmus. Part of the iron in brown iron and ammonium citrate is present as a colloidal dispersion of the oxide, as can be seen when a beam of light is passed through the translucent particles.

These iron and ammonium citrates are available only as solutions or as amorphous and very hygroscopic solids. As an example of their hygroscopicity, they absorb water so rapidly that when breathed upon they quickly become moist to the touch, the particles soon fuse together, and eventually the material becomes a semi-liquid mass. This is an inherent property of these mixtures and it greatly limits their usefulness. They are, for example, unsuitable for pharmaceutical pills and powders and can only be dispensed as solutions or in capsule form. Even ordinary handling or storage presents many problems. Moreover, when used in light-sensitive coatings to make blue-print papers, their hygroscopicity is believed to be one of the underlying causes of the poor stability of blue-print paper.

It has been believed that the amorphous nature of these compositions is unavoidable, and that they could not be crystallized because they lacked a definite chemical structure, an essential prerequisite for crystallinity.

Not only are the products themselves unsatisfactory in many respects, but there are also objectionable features in the processes for making them. Because they will not crystallize, solid products can be prepared only by evaporating solutions of the citrates to dryness. This is done either by spreading a thin film of the solution over a hot surface, in which case thin plates called scales result; or the solutions are evaporated in a vacuum, in which case large granules, called pearls, are obtained. In either case, the amount of heat consumed is very great, and the labor required is considerable unless elaborate equipment is used.

It has now been found in accordance with the present invention that iron and ammonium citrates can be prepared in crystalline form. These new crystalline ferric ammonium citrates possess a definite chemical structure as proved by their chemical and physical properties. They are in the form of true crystals. One of their most valuable and surprising features is the comparative absence of hygroscopicity compared with the old amorphous citrates. Although they do absorb some water, it is at a much slower rate, and they can be exposed to a high relative humidity for many hours and still show only a slight gain in weight. Even when exposed to the atmosphere for very long periods of time they do not liquefy or become sticky as the amorphous products do.

Not only are the products themselves more valuable, but they are more easily and economically manufactured.

In making the amorphous citrates, ferric hydroxide is heated with a solution of ammonium citrate until it is dissolved. The proportions depend upon the desired composition of the final product.

Although it has generally been the practice to combine 1 to 1.5 moles of citric acid or ammonium citrate with one mole of ferric hydroxide in the manufacture of iron and ammonium citrate, it has now been found that if the ferric hydroxide is first dissolved in a solution of an ammonium citrate, corresponding to only about 0.65 mole of citric acid for each mole of ferric hydroxide, before the remainder of the citric acid is added, then a solution is obtained from which ferric ammonium citrate can be crystallized. The density and pH of the solution as well as the final ratio of iron and citric acid appear to be of only minor importance, having more or less effect upon the yield but appearing to have little effect upon the crystallinity of the product.

Green crystals are normally obtained from this process even when the ratio of iron to citric acid corresponds to that for the amorphous brown iron and ammonium citrate and the solution is made as alkaline as possible with aqueous ammonium hydroxide. Under these strongly alkaline conditions the mother liquor is brown and it imparts a superficial brown color to the resulting crystals; but this color is readily removed when the crystals are washed with a small amount of alcohol or chilled water. If, however, the solution is saturated with gaseous ammonia, true brown crystals are obtained whose optical properties differ significantly from the optical properties of the green crystals. The proportion of iron in these brown crystals is not greater than in the green crystals, as one would expect, but is of the same order.

The following examples illustrate the invention:

*Example 1*

Sufficient ammonium hydroxide was added to an aqueous solution of ferric sulfate (200 g. ferric sulfate) to precipitate the iron completely as ferric hydroxide. The precipitate was collected on a Büchner funnel and washed with distilled water until free from sulfate. An assay showed 42.9 g. (0.77 mole) Fe as Fe(OH)$_3$.

The moist precipitate of ferric hydroxide was added to a solution of citric acid (106 g., 0.505 mole) and ammonium hydroxide (165 ml. 20° Bé. solution, approx. 1.60 moles NH$_3$ in 90 ml. of water). The pH, determined with a glass electrode, was 7.40. After boiling the mixture for 15 minutes, additional ammonia (15 ml. of 20° Bé. solution, 0.07 mole) was added, and boiling was resumed for 75 minutes, the volume being kept constant by addition of water. The remaining citric acid (106 g., 0.505 mole) was then added and the mixture was boiled for one hour while the volume was kept constant. The resulting solution was filtered. The filtrate was concentrated to a density of 49° Bé., ammonia was added until the pH was 6.05 (2 ml. of the viscous sirup was diluted with 25 ml. distilled water and the pH was determined with a glass electrode), and finally, the liquor was concentrated to 51° Bé., then cooled in an ice chest. Crystallization was completed in about 4 days. The resulting green crystals of ferric ammonium citrate were centrifuged, washed with alcohol and dried at 105° C. Approximately 117 g. of crystals were recovered. Additional crops could be obtained from the mother liquor so that the overall yield approached 100%.

*Example 2*

Ferric hydroxide (equivalent to 42.9 g. Fe as Fe(OH)$_3$, 0.77 mole), prepared as in Example 1, was added to an aqueous solution of citric acid (106 g., 0.505 mole) adjusted to a pH of 5.20 with ammonia, which corresponds to a solution of diammonium citrate. After boiling the solution for 90 minutes, diammonium citrate (0.505 mole) was added and the solution was again boiled for another 15 minutes, by which time all of the ferric hydroxide had dissolved. The liquor was filtered and evaporated to 49° Bé. The pH was adjusted to 5.85 as described in Example 1; and the liquor was finally evaporated to 51° Bé. After the liquor had been in an ice chest for 4 days, crystallization was induced by adding three very small crystals of sodium chloride. Two days later crystallization was well advanced and appeared to be complete in another two days. The green crystals of ferric ammonium citrate were collected, washed and dried as in Example 1.

*Example 3*

Citric acid (233 g., 1.1 moles) was dissolved in water (190 ml.) and made neutral or at most only faintly alkaline to litmus with ammonium hydroxide (about 272 g. of 20° Bé. solution. Freshly precipitated and thoroughly washed ferric hydroxide (corresponding to 93–94 g. Fe., approx. 1.7 moles) was added with stirring and the mixture was boiled for fifteen minutes. Additional ammonia (23 g. of 20° Bé solution) was then added and boiling was continued for a total of ninety minutes. During this time the volume was kept constant by the periodic addition of water. More citric acid (233 g., 1.1 moles) was added and boiling and stirring were resumed for sixty minutes, while the volume was kept constant by addition of water. During this time the color of the solution changed from a reddish brown to a deep green. The solution was filtered with suction through a coarse filter paper and the filtrate was carefully evaporated to 49° Bé. (determined on the hot solution). The sirupy mixture was continuously stirred during this stage to prevent bumping and because of the tendency of the mixture to char near the bottom of the beaker. The pH was adjusted to 5.2–5.4, the measurement being made as in Example 1. Finally the adjusted liquor was evaporated to a density of 51° Bé. and set aside to cool. It was protected from light to prevent decomposition. Crystallization was induced by scratching the sides of the beaker with a glass rod. The green crystals of ferric ammonium citrate were separated by centrifugation and dried. They could, if desired, be washed with alcohol.

Chemical analysis of the crystals obtained in the foregoing examples showed 14.7% Fe and 8.6% NH₃ by weight.

The crystals were found to consist of small, interpenetrating, birefringent units, presumably due to extremely extensive twinning. This circumstance effectively prevented obtaining any crystallographic data other than the crystal optical properties that could be studied with a microscope.

The untwinned crystals were biaxial, with the following refractive indices:

$$\alpha = 1.581 \pm 0.003$$
$$\beta = 1.595 \pm 0.003$$
$$\gamma = 1.610 \pm 0.003$$

The optic angle (2V) was large and the optic sign was positive. Dispersion of the optic angle was medium strong with the angle greater for red than for violet light ($\gamma > v$).

The crystalline structure of this green ferric ammonium citrate was confirmed by X-ray diffraction studies, using the powder method. Numerous sharp lines were observed. Examination of amorphous scales and pearls showed no lines.

Carefully weighed portions of the green crystals and amorphous iron and ammonium citrate were exposed to a relative humidity of 79% at room temperature. The samples were then reweighed at intervals of from one to twenty-four hours. In Fig. 1 the hygroscopicities, expressed in per cent gain in weight, of the green crystals and of the amorphous products are compared. Not only was the total gain in weight much less for the crystals, but they gained weight at a much slower rate during the first twenty-four hours of exposure.

Example 4

Freshly precipitated and thoroughly washed ferric hydroxide (corresponding to approximately 200 g. Fe, 3.6 moles) was boiled for about ninety minutes with an aqueous solution of citric acid (500 g., 2.4 moles) containing sufficient ammonium hydroxide (about 600 g. of 20° Bé solution) to make it neutral or faintly alkaline to litmus. Additional citric acid (350 g., 1.7 moles) was then added and the solution was evaporated with heating and stirring to a specific gravity of 1.25 (at 25° C.). The liquor was transferred to a flask and saturated with ammonia gas while stirring it frequently with the tube used to introduce the gas. Anhydrous ammonia is desirable for this purpose so as to minmize dilution of the solution, but is not essential. The flask was stoppered with excess ammonia present and allowed to stand at room temperature until crystallization was complete. The reddish-brown crystals were separated from the mother liquor by centrifugation. Then they were spread in a thin layer over the bottom of a dish and air-dried.

Larger and more perfect crystals were obtained when the saturated solution was chilled in an ice bath before it was saturated with ammonia. The vessel containing the liquor was then left in an ice bath until the whole system came to room temperature.

Brown crystals, prepared as above, contained approximately 14% Fe. A part of this iron was in the form of a colloidal dispersion of iron oxide that could be seen when a beam of light was passed through the crystals.

The optical properties of the brown crystals were in general quite similar to those of the green crystals. The refractive indices were:

$$\alpha = 1.540 \pm 0.03$$
$$\beta = 1.595 \pm 0.03$$
$$\gamma = 1.641 \pm 0.003$$
$$n_{av} = 1.592$$

The optic angle was large and the dispersion was strong. The crystals probably were triclinic.

The crystalline structure of the brown ferric ammonium citrate was confirmed by X-ray diffraction studies, using the powder method. Numerous sharp lines were observed. On the other hand, amorphous brown iron and ammonium citrate showed no lines.

Carefully weighed portions of two forms each of crystalline and amorphous brown ferric ammonium citrate were exposed to a relative humidity of 79% at room temperature. The samples were then reweighed at intervals of from one to twenty-four hours. In Fig. 2, the hygroscopicities, expressed in per cent gain in weight, are compared. Not only was the total gain in weight for the crystals much less, but they gained weight at a much slower rate during the first twenty-four hours of exposure.

In view of the above, it will be seen that the several objects of the invention are achieved and other advantageous results attained.

As many changes could be made in the above methods and products without departing from the scope of the invention, it is intended that all matter contained in the above description or shown in the accompanying drawing shall be interpreted as illustrative and not in a limiting sense.

We claim:

1. The green crystalline ferric ammonium citrate containing approximately 14.7% iron and approximately 8.6% ammonia by weight and which will produce sharp lines when studied by the powder method of X-ray diffraction.

2. The green crystalline ferric ammonium citrate containing approximately 14.7% iron and approximately 8.6% ammonia by weight and which will produce sharp lines when studied by the powder method of X-ray diffraction, the crystals thereof being biaxial and having substantially the following refractive indices:

$$\alpha = 1.581 \pm 0.003$$
$$\beta = 1.595 \pm 0.003$$
$$\gamma = 1.610 \pm 0.003$$

3. The brown crystalline ferric ammonium citrate containing approximately 14% iron by weight and having a refractive index $n$ equal to approximately 1.592 which will produce sharp lines when studied by the powder method of X-ray diffraction.

4. The brown crystalline ferric ammonium citrate containing approximately 14% iron by weight and having a refractive index $n$ equal to approximately 1.592 which will produce sharp lines when studied by the powder method of X-ray diffraction, a portion of the crystals thereof being triclinic and having substantially the following refractive indices:

$$\alpha = 1.540 \pm 0.03$$
$$\beta = 1.595 \pm 0.03$$
$$\gamma = 1.641 \pm 0.003$$

5. The method of forming crystalline ferric ammonium citrate which comprises adding ferric hydroxide to a mixture of citric acid and ammonium hydroxide in the ratio of approximately 1 mole of ferric hydroxide to 0.65 mole of citric acid, thereafter adding an additional quantity of citric acid, and crystallizing ferric ammonium citrate therefrom.

6. The method of forming crystalline ferric ammonium citrate which comprises adding ferric hydroxide to a mixture of citric acid and ammonium hydroxide in the ratio of approximately 1 mole of ferric hydroxide to 0.65 mole of citric acid while maintaining the pH between approximately 5 and 8, thereafter adding an additional quantity of citric acid, and crystallizing ferric ammonium citrate therefrom.

7. The method of forming crystalline ferric ammonium citrate comprising adding ferric hydroxide to an approximately neutral solution of citric acid and ammonium hydroxide in the ratio of approximately 1 mole of ferric hydroxide to approximately 0.65 mole of citric acid, adding additional citric acid approximately equal in quantity to the previously added citric acid, and crystallizing ferric ammonium citrate therefrom.

8. The method of forming green crystalline ferric ammonium citrate which comprises adding ferric hydroxide to a mixture of citric acid and ammonium hydroxide in the ratio of approximately 1 mole of ferric hydroxide to 0.65 mole of citric acid while maintaining the pH between approximately 5 and 8, thereafter adding an additional quantity of citric acid, and crystallizing green ferric ammonium citrate therefrom.

9. The method of forming green crystalline ferric ammonium citrate which comprises adding ferric hydroxide to a mixture of citric acid and ammonium hydroxide in the ratio of approximately 1 mole of ferric hydroxide to 0.65 mole of citric acid while maintaining the pH between approximately 5 and 8, adding an additional quantity of citric acid approximately equal to the previously added quantity, and crystallizing ferric ammonium citrate therefrom.

10. The method of forming brown crystalline ferric ammonium citrate comprising adding ferric hydroxide to an approximately neutral solution of citric acid and ammonium hydroxide in the ratio of approximately 1 mole of ferric hydroxide to approximately 0.65 mole of citric acid, adding an additional quantity of citric acid, maintaining the resulting mixture saturated with ammonia, and crystallizing brown ferric ammonium citrate from said mixture.

11. The method of forming brown crystalline ferric ammonium citrate comprising adding ferric hydroxide to an approximately neutral solution of citric acid and ammonium hydroxide in the ratio of approximately 1 mole of ferric hydroxide to approximately 0.65 mole of citric acid, adding additional citric acid approximately equal in quantity to the previously added citric acid, maintaining the resulting mixture saturated with ammonia, and crystallizing brown ferric ammonium citrate from said mixture.

12. The method of forming brown crystalline ferric ammonium citrate comprising adding ferric hydroxide to an approximately neutral solution of citric acid and ammonium hydroxide in the ratio of approximately 1 mole of ferric hydroxide to approximately 0.65 mole of citric acid while maintaining the pH between approximately 5 and 8, adding an additional quantity of citric acid, maintaining the resulting mixture saturated with ammonia, and crystallizing brown ferric ammonium citrate from said mixture.

13. The method of forming brown crystalline ferric ammonium citrate comprising adding ferric hydroxide to an approximately neutral solution of citric acid and ammonium hydroxide in the ratio of approximately 3.6 moles of ferric hydroxide to approximately 2.4 moles of citric acid while maintaining the pH between approximately 5 and 8, adding an additional approximately 1.7 moles quantity of citric acid, maintaining the resulting mixture saturated with ammonia, and crystallizing brown ferric ammonium citrate therefrom while maintaining said mixture saturated with ammonia.

14. A compound selected from the group consisting of the green crystalline ferric ammonium citrate containing approximately 14.7% iron and approximately 8.6% ammonia by weight, and the brown crystalline ferric ammonium citrate containing approximately 14% iron by weight and having a refractive index $n$ equal to approximately 1.592, each of which compounds will produce sharp lines when studied by the powder method of X-ray diffraction.

HARRY J. KRUSE.
HENRY C. MOUNCE.

References Cited in the file of this patent

UNITED STATES PATENTS

| Number | Name | Date |
|---|---|---|
| 1,508,448 | Glaeser | Sept. 16, 1924 |
| 2,081,547 | Mattheus | May 25, 1937 |

OTHER REFERENCES

Belloni: Gazzetta Chimica Italiana, vol. 50 (1920), pages 190–198, 204–212, 2nd part.

Osol et al: United States Dispensatory, 24th edition, 1947, pages 465–467.